US010024882B2

(12) United States Patent
Aaltonen et al.

(10) Patent No.: US 10,024,882 B2
(45) Date of Patent: Jul. 17, 2018

(54) CONTINUOUS SELF-TEST IN CAPACITIVE SENSOR

(71) Applicant: MURATA MANUFACTURING CO., LTD., Nagaokakyo-shi, Kyoto (JP)

(72) Inventors: Lasse Aaltonen, Espoo (FI); Teemu Salo, Riihimäki (FI)

(73) Assignee: MURATA MANUFACTURING CO., LTD., Nagaokakyo-Shi, Kyoto (JP)

( * ) Notice: Subject to any disclaimer, the term of this patent is extended or adjusted under 35 U.S.C. 154(b) by 319 days.

(21) Appl. No.: 14/992,107

(22) Filed: Jan. 11, 2016

(65) Prior Publication Data

US 2016/0202286 A1    Jul. 14, 2016

(30) Foreign Application Priority Data

Jan. 12, 2015 (FI) ..................... 20155015

(51) Int. Cl.
G01P 21/00 (2006.01)
G01C 25/00 (2006.01)
G01P 15/125 (2006.01)

(52) U.S. Cl.
CPC .............. G01P 21/00 (2013.01); G01C 25/00 (2013.01); G01P 15/125 (2013.01)

(58) Field of Classification Search
CPC .................................................. G01P 21/00
See application file for complete search history.

(56) References Cited

U.S. PATENT DOCUMENTS

| 5,900,529 | A | 5/1999 | Hanisko et al. |
| 6,629,448 | B1 | 10/2003 | Cvancara |
| 2004/0177691 | A1 | 9/2004 | Kunda et al. |

(Continued)

FOREIGN PATENT DOCUMENTS

| EP | 1 189 025 A2 | 3/2002 |
| EP | 1 548 417 A1 | 6/2005 |
| EP | 1 959 233 A1 | 8/2008 |

OTHER PUBLICATIONS

Finnish Search Report dated Sep. 9, 2015 corresponding to Finnish Patent Application No. 20155015.

(Continued)

*Primary Examiner* — Robert R Raevis
(74) *Attorney, Agent, or Firm* — Squire Patton Boggs (US) LLP

(57) ABSTRACT

A capacitive sensor device includes capacitive elements for detecting at least two inertial channels. At least one of the inertial channels comprises at least two self-test tones with distinctive fundamental frequencies. Inertial signals in the at least two inertial channels are caused by change of capacitance in the capacitive elements due to movements of rotor masses. Self-test tones are fed into at least one capacitive element under control of a self-test control module and the at least two inertial channels are temporally multiplexed to allow feeding of the self-test tones during normal operation of the capacitive sensor device. Signals in the inertial channels are processed for extracting self-test signals corresponding to the self-test tones, and the self-test signals are analyzed for self-test purposes. Alarm is triggered if multiple consecutive samples of predefined set of self-test signals indicate error with same polarity.

22 Claims, 10 Drawing Sheets

(56) References Cited

U.S. PATENT DOCUMENTS

| | | | |
|---|---|---|---|
| 2008/0190199 A1* | 8/2008 | Prandi | G01C 19/5726 73/504.12 |
| 2009/0241634 A1 | 10/2009 | Acar | |
| 2010/0145660 A1 | 6/2010 | Lang et al. | |
| 2011/0146402 A1 | 6/2011 | Donadel et al. | |
| 2014/0250969 A1 | 9/2014 | Alagarsamy et al. | |

OTHER PUBLICATIONS

International Search Report application No. PCT/IB2016/050088 dated Apr. 20, 2016.

* cited by examiner

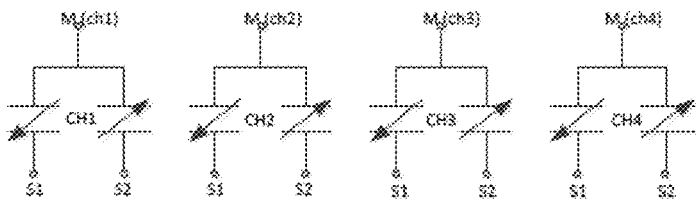
Figure 7a
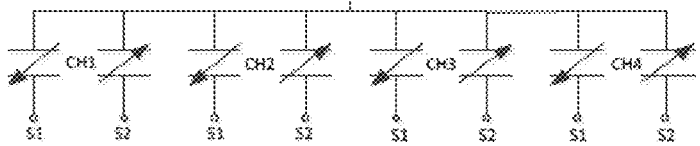
Figure 7b
Figure 8

CONTINUOUS SELF-TEST IN CAPACITIVE SENSOR

BACKGROUND

Field

The present invention relates to microelectromechanical devices and specifically to an inertial sensor with self-test capability and a self-test method for an inertial sensor.

Description of the Related Art

Micro-Electro-Mechanical Systems or MEMS can be defined as micro-scale mechanical and electro-mechanical systems where at least some elements have a mechanical functionality. MEMS structures can be applied to quickly and accurately detect very small changes in physical properties.

Capacitive microelectromechanical sensors have become part of many consumer devices and they are used also in a variety of safety critical applications, such as electronic stability control (ESC). Especially in the safety related applications, it is important to identify potential failures in mechanical or electrical signal paths of the capacitive sensor.

A capacitive sensor comprises at least one microelectromechanical element that comprises at least one capacitive element. The capacitive element comprises a rotor mass (a.k.a. proof mass or in short, just a rotor) and a stator which remains stationary while the rotor mass moves in response to acceleration. The position of the rotor mass in a reference system is measured by detecting signal capacitance. An electrode attached to or incorporated by the rotor mass and an electrode attached to or incorporated by the stator form a capacitance. When the rotor mass moves relative to the stator or inertial frame of reference, a change in the distance between the electrodes is converted to a change in the capacitance. A single variable capacitor is created between a static electrode of the stator and a moving electrode of the rotor mass (rotor). The total capacitance of the single variable capacitor includes a static capacitance defined by the capacitor configuration and a signal capacitance that results from the motion of the rotor mass in response to external acceleration. A capacitive element may comprise more than one variable capacitors, for example it can be formed as a capacitive bridge or a capacitive half-bridge.

Capacitive transducers in MEMS sensors often apply differential detection with two capacitors. For differential detection, in response to a detected activity, a first capacitor of a capacitor pair generates a first input signal, and a second capacitor of the capacitor pair generates a second input signal. The first input signal and the second input signal may be detected in parallel and processed in combination for added accuracy.

One example of a circuitry suitable for such differential detection is self-balancing capacitor bridge (SBB) where the capacitive transducer consists of a movable plate with a fixed electrode on each side. Together the three electrodes form two capacitors, the charges of which the SBB keeps balanced. Deflection of the plate is normalized with respect to the distance between the fixed electronics. The normalization of the self-balancing capacitor bridge provides a linear and stable transfer function, but higher signal-to-noise levels are required for many modern applications, especially with decreasing signal magnitudes attained from further miniaturized MEMS devices.

Built-in functionality diagnostics is a way to ensure that a device may identify its own erroneous operation rapidly. Recognizing erroneous operation or failure of the device is especially important for devices which are used for critical functionalities. An example of devices with such critical functionality is accelerometers in automotive components. Continuous self-testing provides a reliable way to monitor the operation of a device, and provides significant amount of information of critical internal variations.

Multiplexing is a known method to decrease ASIC circuit area, when processing of more than one signal is needed. It allows using at least partially the same circuitry for processing multiple signals.

U.S. Pat. No. 6,629,448 presents a system where normal and self-test intervals alternate. When the device is in a self-test mode, self-test bias excitation and detection phases alternate. In self-test mode, a DC signal is used in biasing phase for excitation, and in detection phase the capacitance is detected utilizing an AC signal. The DC test signal cannot however be used during normal operation, since there is no way of making difference between self-test response and real inertial acceleration. In normal operation mode, the device uses zero bias DC voltage.

Patent application publication US 2009/0241634 presents a sensor system with continuous self-testing. Here a single test frequency with clearly higher frequency than the normal operation signal band is fed to the device, and a response is detected by a test response comparator in the output of the device during normal operation. This solution, however, requires wide band amplifiers and an additional demodulation stage, making the implementation power consuming and complex.

SUMMARY

An object of the present invention is to provide for a capacitive sensor a local self-test capability that avoids or at least alleviates at least one of the above challenges.

The present invention is based on the idea of providing a continuous self-testing capability for a multiplexing capacitive sensor.

Embodiments of the present invention have the advantage that self-testing functionality may be continuous, and it causes minimal parasitic effects and minimal additional area consumption especially in the analog parts of the circuitry.

According to a first aspect, a capacitive sensor device with continuous self-testing is provided. The sensor device comprises at least two capacitive elements configured to detect at least two inertial channels. At least one of the at least two inertial channels comprises at least two self-test tones with distinctive fundamental frequencies and multiplexer circuitry for temporally multiplexing the at least two inertial channels.

According to a second aspect, the sensor device further comprises self-test control circuitry configured to control feeding of the at least two self-test tones into the at least one capacitive element of the sensor device, readout circuitry configured to provide voltage readout information on each of the at least two multiplexed inertial channels, demultiplexer circuitry configured to demultiplex the at least two multiplexed inertial channels into at least two parallel inertial output channels, and self-test processing circuitry configured to process the at least two inertial output channels for extracting at least two self-test signals corresponding to the at least two self-test tones.

According to a third aspect, the sensor device further comprises self-test monitoring circuitry configured to continuously analyze the at least two self-test signals. The self-test monitoring circuitry triggers an alarm when an error condition is detected.

According to a fourth aspect, the at least two capacitive elements comprise capacitive half-bridge circuitries. The capacitive half-bridge circuitries comprise any one of a common rotor connection, and separate rotor connections.

According to a fifth aspect, the sensor device further comprises at least one analog-to-digital converter circuitry. The at least two inertial output channels comprise digital signals, and the analog-to-digital converter circuitry is configured to perform any one of converting the at least two inertial channels into digital signals prior to demultiplexing the at least two inertial channels for producing the at least two inertial output channels; and converting the at least two inertial output channels into digital signals after the at least two inertial output channels have been demultiplexed.

According to a sixth aspect, the sensor device comprises circuitry for feeding each one self-test tone as temporally controlled bias voltage pulses to at least one stator of a selected capacitive element. The self-test tone is fed to the selected capacitive element only when the respective capacitive element is not being detected by the readout circuitry.

According to a seventh aspect, the fundamental frequency of the self-test tone is defined by the frequency of switching the polarity of trains of the bias voltage pulses fed to at least two stators of the selected capacitive element.

According to an eighth aspect, a phase of the self-test tone is adjusted by temporally adjusting the timing of the start of the train of bias voltage pulses fed into a selected stator of the selected capacitive element.

According to a ninth aspect, the bias voltage pulses of the self-test tone are fed to the at least one stator in at least one of only during a reset period of a channel selection period of another inertial channel, and during both a reset period and a readout period of a channel selection period of another inertial channel.

According to a tenth aspect, the self-test control module is configured to control the magnitude of the self-test tone by adjusting a number of bias voltage pulses per period of the fundamental frequency fed to the at least one stator.

According to an eleventh aspect, a number of bias voltage pulses per period of the fundamental frequency fed to the at least one stator is adjusted in any one of the period between two consecutive bias voltage pulses remains the same during a defined part of each half of the fundamental frequency period of the self-test tone, and set number of bias voltage pulses is divided evenly over the period of the fundamental frequency of the self-test tone.

According to a twelfth aspect, each of the at least two inertial channels comprise at least two different self-test tones with distinctive fundamental frequencies.

According to a thirteenth aspect, the capacitive sensor device comprises at least three capacitive elements for detecting at least three inertial channels. Each of the at least three inertial channels comprises at least two different self-test tones with distinctive fundamental frequencies.

According to a fourteenth aspect, the frequency of each of the at least two self-test tones is higher than the frequency of the wanted inertial signal.

According to a fifteenth aspect, the self-test processing and monitoring circuitry comprises one set of circuitry for each inertial output channel comprising at least two self-test tones. Each set of circuitry comprises one of i) one decimation filter for each self-test tone comprised in the inertial output channel and ii) one decimation filter for filtering the inertial output channel. The at least one set of circuitry further comprises a set of demodulators, one demodulator for each self-test tone comprised in the respective inertial output channel, configured to convert each of the self-test tones to a DC self-test signal corresponding to the respective self-test tone, a second set of filters for extracting each self-test signal and optionally a state machine for continuously analyzing magnitude and polarity of the extracted self-test signals.

According to a sixteenth aspect, an alarm is triggered when a predefined number of consecutive samples in each of a predefined set of self-test signals indicate error with the same polarity.

According to another aspect, a method is provided for continuous self-testing of a capacitive sensor device. The method comprises detecting output of at least two capacitive elements, the output corresponding to at least two inertial channels. At least one of the at least two inertial channels comprises at least two self-test tones with distinctive fundamental frequencies and temporally multiplexing the at least two inertial channels.

According to another aspect, the method further comprises controlling feeding of the at least two self-test tones into the at least one capacitive element of the capacitive sensor device, providing voltage readout information on each of the at least two multiplexed inertial channels, demultiplexing the at least two multiplexed inertial channels into at least two parallel inertial output channels, and processing the at least two inertial output channels for extracting at least two self-test signals corresponding to the at least two self-test tones.

According to another aspect, the method further comprises continuously analyzing the at least two self-test signals, and based on the continuous analyzing, triggering an alarm when an error condition is detected.

According to another aspect, the at least two inertial output channels comprise digital signals. The digital signals are obtained by any one of converting the at least two inertial channels into digital signals prior to demultiplexing the at least two inertial channels for producing the at least two inertial output channels, and converting the at least two inertial output channels into digital signals after the at least two inertial output channels have been demultiplexed.

According to another aspect, the method can include feeding each one self-test tone as temporally controlled bias voltage pulses to at least one stator of a selected capacitive element. The self-test tone is fed to the selected capacitive element only when the respective capacitive element is not being detected.

According to another aspect, the method can include defining the fundamental frequency of the self-test tone by the frequency of switching the polarity of the trains of bias voltage pulses fed to at least two stators of the According to another aspect, the method can include controlling the phase of the self-test tone by temporally adjusting the timing of the start of each train of bias voltage pulses fed into a selected stator of the selected capacitive element.

According to another aspect, the method can include controlling the magnitude of the self-test tone by adjusting the number of bias voltage pulses per period of the fundamental frequency fed to the at least one stator.

According to another aspect, the bias voltage pulses are fed to the at least one stator in at least one of only during a reset period of a channel selection period of another inertial channel, and during both a reset period and a readout period of a channel selection period of another inertial channel.

According to another aspect, the method can include adjusting the number of bias voltage pulses per period of the fundamental frequency fed to the at least one stator of the sensor device. The adjusting comprises any one of keeping the period between two consecutive bias voltage pulses the same during a defined part of each half of the fundamental frequency period of the self-test tone, and dividing set number of bias voltage pulses evenly over the period of the fundamental frequency of the self-test tone.

According to another aspect, each of the at least two inertial channels comprise at least two different self-test tones with distinctive fundamental frequencies.

According to another aspect, the capacitive sensor device comprises at least three capacitive elements for detecting at least three inertial channels. Each of the at least three signal channels comprising at least two different self-test tones with distinctive fundamental frequencies.

According to another aspect, the frequency of each of the at least two self-test tones is higher than the frequency of the wanted inertial signal.

According to another aspect, for each inertial output channel comprising self-test tones, the method further comprises: i) decimation filtering the inertial output channel separately for each self-test tone, ii) converting each of the self-test tones to a DC self-test signal corresponding to a self-test tone, iii) filtering for extracting each self-test signal. In some embodiments, the method can also comprise iv) continuously analyzing magnitude and polarity of the extracted self-test signals.

According to yet another aspect, an alarm is triggered when a predefined number of consecutive samples in each of a predefined set of self-test signals indicate error with the same polarity.

BRIEF DESCRIPTION OF THE DRAWINGS

In the following the invention will be described in greater detail, in connection with preferred embodiments, with reference to the attached drawings, in which

FIGS. 7a and 7b present examples of channel capacitor configurations;

FIG. 8 presents an example of timing of multiplexed channels;

DETAILED DESCRIPTION

Figures 1, 2:
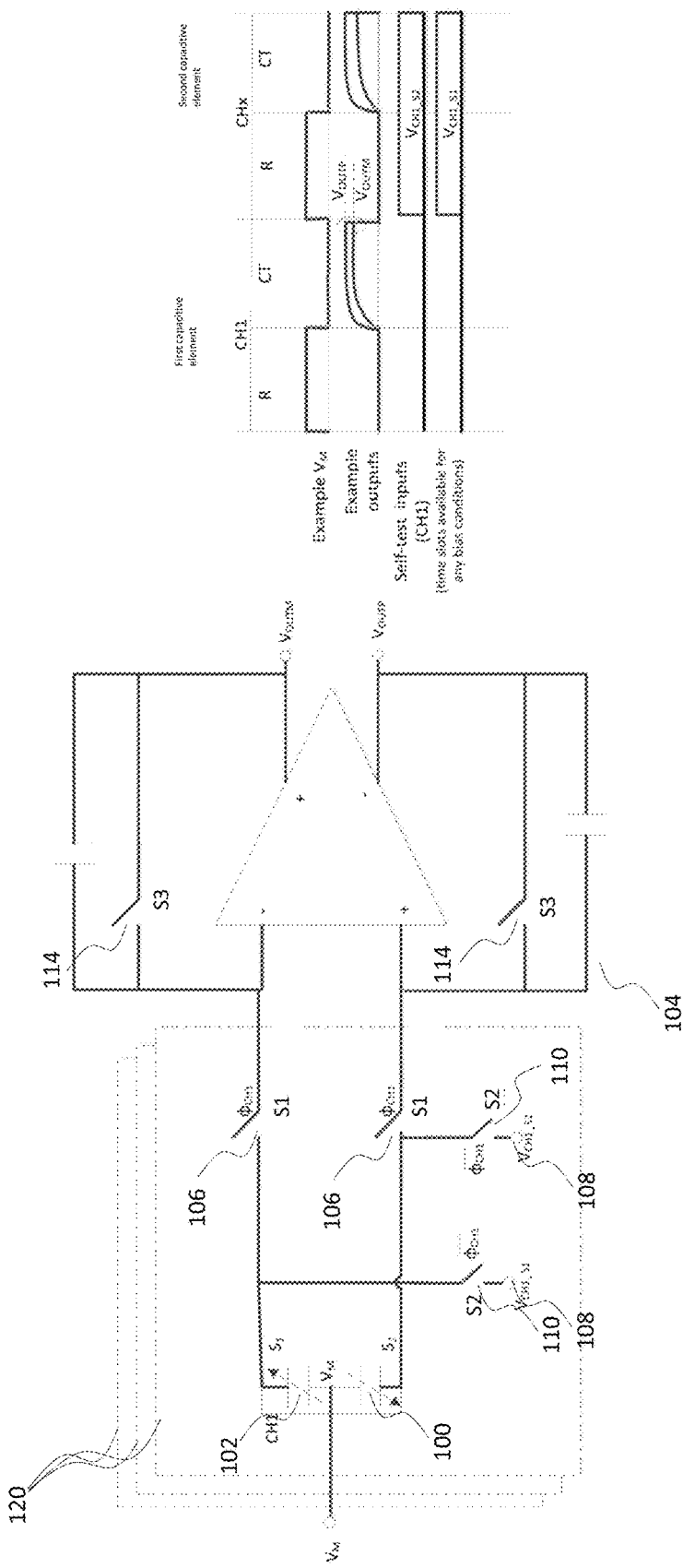
FIG. 1 shows a simplified diagram of a capacitive sensor and a readout circuitry.
FIG. 2 further illustrates operation of the circuitry of FIG. 1.

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

As used herein, the term "circuitry" refers to all of the following: (a) hardware-only circuit implementations, such as implementations in only analog and/or digital circuitry, wherein the circuitry may comprise discrete and/or integrated components, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of "circuitry" applies to all uses of this term in this application. As a further example, as used in this application, the term "circuitry" would also cover an implementation of merely a processor for multiple processors, or a portion of a processor and its (or their) accompanying software and/or firmware. The term "circuitry" would apply to one or more application specific integrated circuit ASIC(s) or applications processor integrated circuit(s) for a microelectronic sensor device or system.

As used in this application, "a capacitive element" represents circuitry capable of capacitive detection of movement of a rotor mass in relation to one or more stationary stators. Capacitive element may comprise a single variable capacitor, but it may also comprise two or more capacitors used for detecting movement of same rotor mass. An example of a capacitive element is a capacitive half-bridge.

"Inertial channel" comprises electrical signal originating from one capacitive element, carrying information about the results of electrical detection of the capacitive element. Inertial channel may comprise a differential signal. The electrical signal in the inertial channel may be processed by circuitry i.e. in order to amplify, filter or convert the electrical signal into a different form (i.e. turn an analog signal into a digital signal or a digital signal into an analog signal). Multiple (at least two) inertial channels may be temporally multiplexed and/or demultiplexed. The inertial channel may occasionally called in short "channel", and a signal channel such as a readout channel carrying multiple inertial channels in multiplexed form may be referred to as "multiplexed inertial channels".

"Inertial signal" refers to the electrical signal originating from a capacitive element carrying the information about the movement of the rotor mass. The inertial signal forms part of the signal carried by the in the inertial channel, excluding i.e. the self-test tones.

Term "tone" means an electrical signal or a mechanical, electrically measurable signal having a distinctive fundamental frequency with form of a sine wave. A tone may be carried through a signal channel embedded into a signal having multiple components. A "self-test tone" is a tone used for self-test purposes, and it may be fed to a capacitive element through biasing its stator(s). Self-test tone may be carried over the inertial channel together with the detected inertial signal.

FIG. 1 shows a simplified diagram illustrating basic elements necessary to describe embodiments of the present invention. It illustrates an exemplary embodiment of capacitive acceleration sensor with two variable capacitors 100, 102. The capacitors 100, 102 form a capacitive half-bridge where sensitivity of the first variable capacitor 100 to the rotor mass position is opposite to the sensitivity of the second variable capacitor 102 so that the total capacitances of the capacitors change with opposite signs. Such capacitive half-bridge is one example of a capacitive element. The capacitance on one side of the capacitive half-bridge increases with acceleration, while the other side proportionally decreases. Also capacitive elements with more than two variable capacitors may be applied within the scope.

The capacitive sensor includes also a switched-capacitor readout circuitry 104 for detecting signal capacitances that result from motions of the variable capacitors 100, 102 forming a capacitive element.

In capacitive detection, it is necessary to establish a zero point measurement, i.e. the switched capacitance circuit 104 needs to be reset between sampling periods. The capacitive sensor thus comprises a first switch arrangement S1 106 adapted to electrically couple the readout circuitry 104 to the capacitive element for the duration of a reset period R and a readout period CT of the specific inertial channel, and to electrically decouple the readout circuitry 104 from the one or more variable capacitors 100, 102 forming the capacitive element for reset period(s) R and readout period(s) CT of any other inertial channel. This is illustrated in FIG. 2, where a time period of exemplary signals has been time-divisioned into alternating reset periods R and readout periods CT. First reset period R and readout period CT correspond to inertial channel CH1, whereas the second reset period R and readout period CT correspond to any other inertial channel denoted as CHx.

In the present invention, this time-discrete nature of switched-capacitor detection is applied to implement a voltage generating system to facilitate in-field self-test capability of the sensor device. For this, the capacitive sensor includes an actuation circuitry 108 for generating a bias voltage for electrostatic deflection of the one or more variable capacitors 100, 102. In the current example the two variable capacitors 100, 102 together form a capacitive element. For self-test, the actuation circuitry 108 may be electrically coupled to the one or more variable capacitors 100, 102 forming a capacitive element for a specific channel during the reset periods R and/or readout periods CT of any other capacitive elements, and decoupled from them during the reset period R and readout period CT of the specific capacitive element by means of a second switch arrangement S2 110. When the actuation circuitry 108 is coupled to the capacitive element, the generated bias voltage(s) create an electrostatic force and causes a deflection to the capacitive element. The caused deflection may be detected during the readout period of the inertial channel and applied to determine whether the capacitive element operates normally or not. The second switch arrangement 110 is directly synchronized to the first switch arrangement S1 106. The nature of synchronizing the switching periods of switching arrangement S1 106 and switching arrangement S2 110 is further illustrated with symbols $\phi_{CH1}$ and $\overline{\phi CH1}$, the latter indicating a negative of the former, i.e. that the two switches are switched in opposite phases: when one is open, the other is closed and vice versa. However, this direct synchronizing should not be understood strictly, as the exact timing of switching arrangements S1 106 and S2 110 may not be absolutely same (i.e. the state of the two switch arrangements opposite), but the timing may be suitably planned for the purpose, to handle i.e. transients caused by switching itself. The bias voltages $V_{CH1\_S2}$ and $V_{CH1\_S1}$ generated by the voltage actuation circuitry 108 may be same or different from each other. The second switch arrangement S2 110 is adapted to electrically couple the actuation circuitry 108 to the capacitive element when the feeding of a self-test tone to the capacitive sensor in this channel is enabled by a self-test control circuitry.

The capacitive sensor may further comprise a third switch arrangement S3 114, suitably synchronized to the first switch arrangement 106 and adapted to reset the readout circuitry 104 in the beginning of the read periods. This allows the inputs and outputs of the operational amplifier to settle before occurrence of a read pulse ($V_M$ transient). This eliminates or at least significantly reduces effects of self-test bias related transients from detection. Again, the synchronization should not be understood strictly indicating exactly simultaneous switching, but the timings may be suitably configured to achieve the intended functionality.

For enabling continuous self-testing, the at least one microelectromechanical element comprises at least two capacitive elements. This means that while one capacitive element is used for sensing the inertial signal and self-test tones, the other(s) may be used for feeding the self-test tone(s). In the current example, each capacitive element comprises a capacitive half-bridge comprising two variable capacitors 100, 102. In one exemplary embodiment, further capacitive elements 120 may be similar to the one shown in FIG. 1, but controlled with a different set of switching arrangements and/or actuation circuitry. When all inertial channels are multiplexed into a single multiplexed signal channel, the readout circuitry may be common for all capacitive elements, but if there are several, i.e. at least four, capacitive elements, more than one readout circuits may be used, providing more than one multiplexed signal channels. The light dotted lines indicate an exemplary embodiment comprising three capacitive elements 120.

As a further embodiment, multiplexing at least two self-test tones may be implemented with just two capacitive elements, when the multiplexing scheme is adjusted suitably. Two different self-test tones (having different fundamental frequencies) may be fed into one capacitive element during two different time periods, while reading the inertial data from the other capacitive element. As a result, the at least two self-test tones are available for detecting in at least one inertial channel. Term "different self-test tones" may comprise various arrangements of self-test tones. Some self-test tones for different capacitive elements (inertial channels) may have same fundamental frequency, but may have different magnitudes. However, for implementing a reliable continuous self-test scheme, each inertial channel with self-test capability should have at least two self-test tones with different fundamental frequencies. Preferably, such self-test tones with different fundamental frequencies are not harmonic frequencies of the same fundamental frequency.

FIG. 2 illustrates operation of the capacitive element and readout circuitry of FIG. 1. A voltage $V_M$ across each variable capacitor 100, 102 is modulated in charge up and charge down steps that form two non-overlapping periods. During the first one of them, each variable capacitor 100, 102 is connected to a rotor voltage $V_M$ and accumulates charge. This period is marked with R. During the second period, each variable capacitor 100, 102 is pulled to ground and each variable capacitor 100, 102 is discharged. The switched-capacitor readout circuitry 104 may include a high-gain operational amplifier with a high open-loop gain, and the two variable capacitors 100, 102 may be connected to its inputs. Accordingly, during a readout period CT, when the rotor voltage $V_M$ to a first variable capacitor 100 changes to zero, the output voltage $V_{OUTP}$ changes from zero to a value that corresponds to accumulated charge of the first variable capacitor 100. The readout period CT may sometimes be called as "charge transfer" period, which describes this functionality. Similarly, when the rotor voltage $V_M$ to a second variable capacitor 102 changes to zero, the output voltage $V_{OUTM}$ changes from zero to a value that corresponds to accumulated charge of the second variable capacitor 102. The difference between $V_{OUTP}$ and $V_{OUTM}$ depends on the position of the rotor mass at the time of rotor voltage $V_M$ zero edge. In an alternative, the polarity of the rotor voltage Vm may be changed to opposite, so that the polarity of the change of the resulting output voltages $V_{OUTP}$ and $V_{OUTM}$ are also opposite. It is understood that FIG. 1 is a simplified example with only basic parts necessary for describing the invention. For example, the operational amplifier of the switched-capacitor readout circuitry 104 may have input-common-mode circuitry or it may comprise two single-ended operational amplifiers to keep both the differential and common-mode input of the operational amplifier at a fixed voltage.

FIG. 2 further illustrates an example of multiplexing self-test measurements between different capacitive elements. While the first readout period CT indicates reading out output of a first capacitive element comprising pair of variable capacitors 100, 120, the second readout period CT may be used to read out the output of a second capacitive element, any other one of those indicated with dashed lines 120. The self-test bias voltages $V_{CH1\_S1}$ and $V_{CH1\_S2}$ may be fed to the first capacitive element through the second switch arrangement S2 110 at any time, except during the reset period R and readout period CT of the first capacitive element. The reset period R and the readout period CT of a specific inertial channel may together be called as a channel selection period for this channel. Self-test bias voltages may be fed to any capacitive element during all times, except during the channel selection period of that specific capacitive element.

Figures 3, 4:
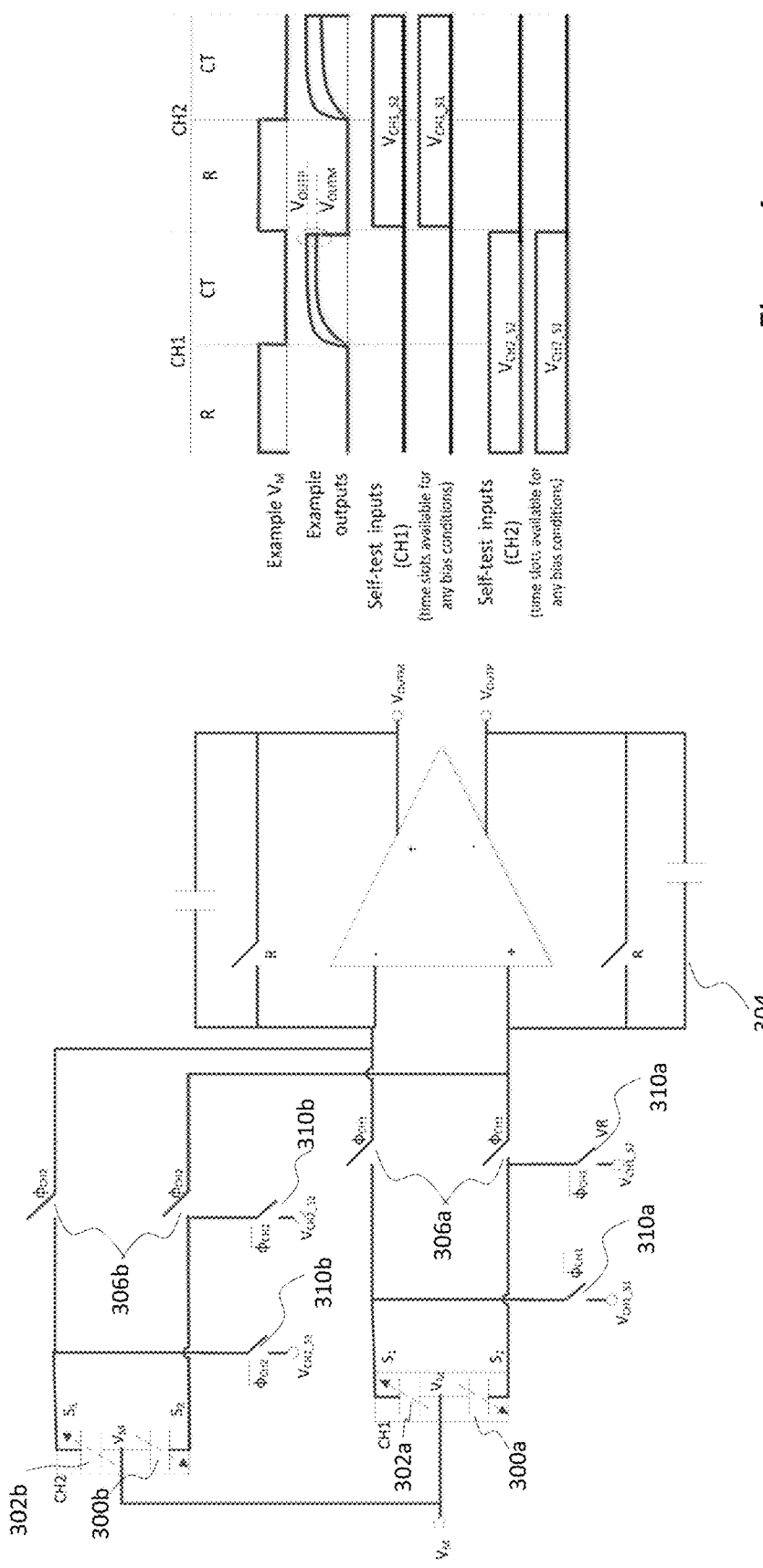
FIG. 3 describes a second exemplary embodiment of a capacitive acceleration sensor circuitry with two pairs of variable capacitors.
FIG. 4 further illustrates operation of the circuitry of FIG. 3.

FIG. 3 describes a second exemplary embodiment of a capacitive acceleration sensor with two pairs of variable capacitors: first pair 300a, 302a for a first channel CH1 and second pair 300b, 302b for a second channel CH2. In similar manner, there may be any number of variable capacitor pairs (capacitive elements), which may be switched and biased separately, while only two pairs (two capacitive elements) have been presented here for simplicity. The rotors of both channels CH1 and CH2 are connected to rotor voltage $V_M$, and stators are connected to different bias voltages according to the multiplexing scheme. In this example, the rotor voltage $V_M$ is common for both pairs of variable capacitors, but alternatively the rotor voltages may also be separate and different. It should be noticed that even though the electrical rotor voltage $V_M$ for the two capacitive elements is the same, the capacitive elements are preferably detecting different rotor masses, which may be mechanically independent of each other. In this example we can see two capacitive elements that may be used for both inertial sensing and for self-testing in multiplexed manner. Switches 310a control connecting the stators of variable capacitors 300a and 302a to bias voltage, for example to self-test bias voltages $V_{CH1\_S1}$ and $V_{CH1\_S2}$. Similarly, switches 310b control connecting the stators of variable capacitors 300b and 302b to bias voltage, for example to self-test bias voltages $V_{CH2\_S1}$ and $V_{CH2\_S2}$.

The capacitive sensor comprises a first switch arrangement 306a adapted to electrically couple the readout circuitry 304 to the first capacitive element, comprising variable capacitors 300a and 302a, for a first channel selection period $\phi_{CH1}$ allocated to the first capacitive element, and to electrically decouple the readout circuitry 304 from the capacitive element (300a and 302a) during a second channel selection period $\phi_{CH2}$ allocated to the second capacitive element comprising variable capacitors 300b and 302b. The capacitive sensor comprises a second switch arrangement 306b adapted to electrically couple the readout circuitry 304 to the second capacitive element during the second channel selection period $\phi_{CH2}$, the second capacitive element comprising variable capacitors 300b and 302b, and to electrically decouple the readout circuitry 304 from the second capacitive element during the first selection period $\phi_{CH1}$ allocated to the first capacitive element. The readout circuitry 304 may be similar to the readout circuitry 104 of FIG. 1, and thus not described in more detail.

FIG. 4 provides a schematic timing diagram for the capacitive acceleration sensor of FIG. 3. In this example, the stator voltage $V_M$ is switched between a positive reference or supply voltage during reset period R and zero voltage during the readout period CT. Timing of the output voltages $V_{OUTP}$ and $V_{OUTM}$ is always inverted when compared to the stator voltage. The multiplexing scheme controls the time slots during which each individual inertial channel may be biased and read. In this example, stators of CH2 may be biased to first bias voltages $V_{CH2\_S1}$ and $V_{CH2\_S2}$ during the first channel selection period CH1, comprising a reset period and a readout period CT, i.e. when CH1 is read, and stators of CH1 may be biased to second bias voltages $V_{CH1\_S1}$ and $V_{CH1\_S2}$ during the second channel selection period CH2, comprising a reset period R and a readout period CT, when CH2 is read. The exact values and timing of the bias voltages may be set in various ways, according to the requirements set for the performance of the device and the self-test scheme. The number and the order of the timing periods of different channels CH1, CH2 is set by the multiplexing scheme. Multiplexing scheme may also be seen in output voltages $V_{OUTP}$ and $V_{OUTM}$ that are received during each readout period CT: during a first readout period, the output voltages $V_{OUTP}$ and $V_{OUTM}$ correspond to the readout of channel CH1, whereas during the second readout period, the output voltages $V_{OUTP}$ and $V_{OUTM}$ correspond to the readout of channel CH2. The number of readout periods may be chosen so that sufficient number of inertial channels comprising inertial signal and self-test tones are put out for further processing.

It should be understood that when a self-test tone is fed to the inertial element, the output of the very capacitive element to which the self-test tone is fed may not be detected directly. Rather, the electrostatic force caused by a self-test tone fed through the stators of the non-detected channel affects an inertial element, i.e. the rotor mass of the element, and these electrostatic forces generate movement components for the inertial element. Multiple self-test tones in at least two different frequencies cause multiple movement components in at least two different frequencies. The inertial element (rotor mass) acts like a mechanical low pass filter towards the electrostatic pulses caused by the self-test tones, so that the electrostatic force caused by the self-test tone pulses fed in each one of the at least two frequencies becomes averaged. This averaging nature causes the movement caused by a self-test tone to become continuous, and it can be detected at any moment. Multiple self-test tones cause the inertial mass having multiple movement components in different frequencies that can be detected in the combined readout signals of each of the channels. While the channel readout is temporally multiplexed so that only one channel is detected at a time, other capacitive elements representing other, currently unread/undetected channels may be used for self-test biasing while one capacitive element is connected to the readout circuitry for detection. This way, the self-test biasing can be implemented using temporally multiplexed readout sequence for the at least two channels.

Figure 5:
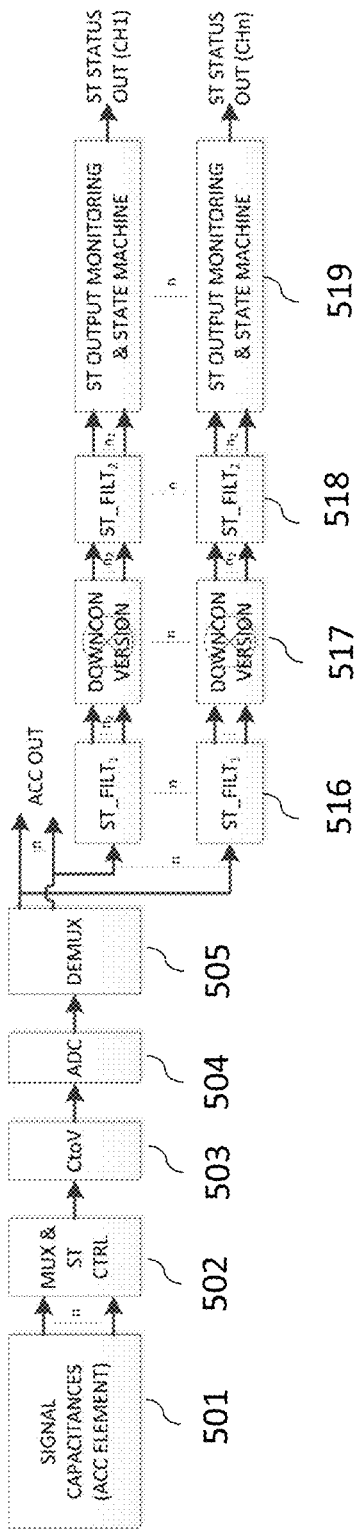
FIG. 5 is a high level block diagram of a circuitry implementing a continuous self-test scheme.

FIG. 5 shows a high level block diagram of an exemplary circuitry implementing a continuous self-test scheme for an accelerometer. The modules represent logical division of different functions, and the circuitry implementing these may comprise separate circuitry dedicated for a specific module or the modules may use some shared circuitry when appropriate. Physically, different functionalities may be combined into one or more blocks of circuitry in various ways without departing from the claimed invention. For example, the functionalities of different modules may be implemented in a general purpose processing environment, or as a dedicated ASIC circuitry.

The accelerometer signal capacitance element ACC 501 provides n parallel measurement signals from n signal channels using, for example, capacitive sensing elements as described in connection to FIGS. 1 to 4. The accelerometer may implement the measurement with capacitive elements, and these signals indicating the acceleration may be called inertial signals, as they're based on relative movement of the rotor due to acceleration. A signal may be detected using a single capacitor, or, more typically, a capacitive half-bridge, such as the one described in FIGS. 1 and 3.

Multiplexing functionality is implemented in the multiplexer and self-test control module 502. In this example, the n signal channels coming into the multiplexing block are temporally multiplexed into a single multiplexed channel. In an alternative embodiment, n signal channels coming from the number of capacitive elements may be temporally multiplexed to more than one multiplexed channel, i.e. four or six signal channels may be multiplexed into two different multiplexed channels, each multiplexed channels comprising at least two inertial channels. The multiplexing scheme will be further explained in relation to FIGS. 6 and 8. Module 502 also handles the self-test control through controlling feeding of the self-test tones into the ACC, and also controlling self-test frequency/frequencies, phase(s) and magnitude(s). Although the multiplexing and self-test control have been shown here as a single module, these functionalities may be implemented in two different modules within the scope.

Readout module 503 is responsible for the readout of the channels. This may correspond to the exemplary functionality of the readout module 104 of FIG. 1 or readout module 304 of FIG. 3. Multiplexing enables having a shared readout channel for multiple capacitive elements instead of a separate readout channel for each n inertial channels. Readout can be characterized as a current to voltage conversion, where current received from the variable capacitors during a readout period is converted into a voltage value. Although not shown, the analog signal received from the readout module 503 may be amplified in one or more amplifier stages. Other components or circuit configurations, capable of performing the claimed features may be applied without deviating from the scope.

Module 504 represents analog-to-digital conversion ADC. Here the analog voltage level read out from the multiplexed inertial channels carried by the readout channel is converted into a digital signal. In this example, there is a single ADC that is placed in the signal chain before the demultiplexer module 505, converting the n multiplexed inertial channels in the readout channel into digital form. Alternatively, analog-to-digital conversion may be implemented only after the demultiplexer module 505, in which case each n inertial channels may have their own ADC. Although such arrangement may appear consuming more chip area, this alternative may allow using ADC's that have less stringent bandwidth requirements, and may thus be more simple to implement in practice than a single ADC handling all channels. Detailed implementation of an ADC is known to a man skilled in the art, and omitted here for simplicity.

Module 505 is a demultiplexer module, which receives the temporally multiplexed readout signals comprising the one or more multiplexed inertial channels, and provides the original number of n parallel inertial output channels ACC OUT for further signal processing. When more than one temporally multiplexed readout channels are received, the demultiplexing may be implemented by one or more demultiplexers. The n inertial output channels ACC OUT correspond to the n inertial channels, including both the in-band inertial signals, and also out-of-band unwanted signal components and self-test tones. Therefore, the inertial output channels ACC OUT will be further filtered with one or more low pass and/or band pass filters so that only the information in the wanted signal band is passed to the output of the device, the wanted signal representing the inertial signal only. These filters are not shown in the figure. As mentioned earlier, the demultiplexer module 505 may also reside prior to the analog-to-digital conversion. In this case the demultiplexer module receives n analog readout signals in the one or more multiplexed readout channels and provides n parallel analog inertial channels, which will then be converted to digital signals preferably with n ADC's. Regardless of the ADC position, the end result is the same: n digital inertial output channels comprising the n2 self-test tones.

In order to realize a robust self-test scheme, more than one self-test tones are needed for each signal channel, because a single self-test tone could be difficult to separate from alternating current AC caused in the ACC element 501 by an external acceleration, causing thus false alarms. Let's describe the number of self-test tones in one inertial channel with n2. Same test frequencies may be used for different signal channels, but also different test frequencies may be chosen. Even multiple self-test signals with same frequency may be used for a single inertial channel, as long as at least two self-test signals per channel have different frequency. Multiplying parameters n and n2 gives the total number of self-test tones comprised in the n inertial channels. All self-test tones may be converted into direct current DC self-test signals through down conversion of each output inertial channel using the same frequency for down conversion that was used as self-test tone frequency in the ACC element. For example, if there are n inertial channels, and each of these has three (n2=3) different self-test tones, the total number of self-test tones available is n*3. These different self-test tones may have same or different frequencies. For preventing interference between the self-test tones and the in-band wanted inertial signals, filtering is typically needed both before and after the down conversion. First self-test filter module 516 precedes the down conversion module 517, containing separate down conversion circuitry for each self-test tone, which is followed by a second self-test filter module 518, used to filter out just the selected DC self-test signal corresponding to the respective self-test tone. The first self-test filter module may be implemented as decimation filter, which converts the ADC output data rate to demodulator input signal rate that corresponds to demodulation carrier signal. The filter also removes the unwanted signal components and noise outside the frequency range of interest and prevents these from coupling to signal band after the demodulation. In the current example, the down converted and filtered self-test signals are then analyzed using a self-test monitoring module 519, which produces output signals indicating whether self-test status shows that the capacitive element works normally, or whether some malfunction has been detected. While the first self-test filter module 516, down conversion module 517 and second self-test filtering module 518 process the self-test tones, we may call these in combination as self-test processing circuitry, which extracts the self-test tones from the inertial output signals for monitoring purposes and converts these into self-test signals suitable for monitoring. Further, the combination of the self-test processing circuitry and the self-test monitoring module 519 may be called as a self-test processing and monitoring circuitry. An exemplary flow chart for a self-test state machine comprised within the self-test monitoring circuitry is described in FIG. 16. The self-test monitoring circuitry is optional, i.e. it does not have to be implemented as an integral part of the accelerometer device. Thus, in an alternative embodiment, the DC self-test signals may be provided as such as a self-test output signal from the accelerometer, so that the analysis for error monitoring may occur outside the accelerometer device. In example, the self-test signals may be monitored by separate circuitry configured for monitoring the self-test signals, which circuitry may be a dedicated circuitry for the monitoring, or it may be a shared circuitry, used in common with other functionalities.

The blocks described in FIG. 5 may be implemented in various ways without departing from the invention. The blocks may comprise any number of discrete components and/or integrated circuitry and/or a number of software components, which may be run on a general purpose processing device or in an application specific processing environment. The circuitry may be general purpose circuitry or it may comprise special purpose circuitry, such as one or more application specific integrated circuit ASICs. The circuitry comprises RAM and/or ROM memory for storing the application program code, or has access to external RAM or ROM memory for accessing the program code.

Figure 6A:
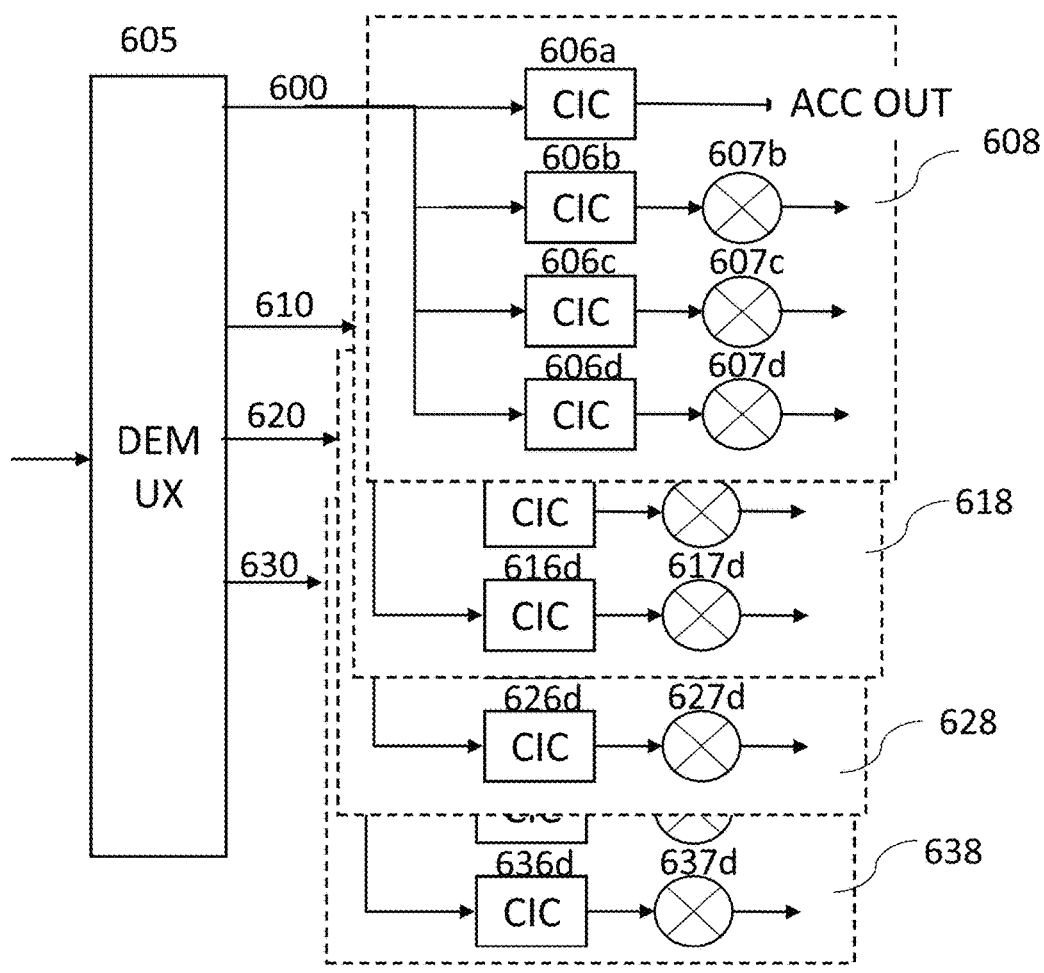
FIG. 6a is a block diagram of a circuitry implementing demultiplexer, filter and down conversion.

FIG. 6a presents an exemplary embodiment of the demultiplexing, first filtering and down conversion circuitry. Multiplexed readout channels arrive to demultiplexer module 605, where they're divided to n parallel inertial channels 600, 610, 620, 630. In this example n is 4. Each of these n inertial channels is filtered with a group of CIC (cascaded integrator-comb) filters 606a to 606d, 616a to 616d, 626a to 626d, 636a to 636d, which are typically used in multi-rate digital signal processing. We'll describe the functionality of one exemplary set 608 of CIC filters 606a, 606b, 606c, 606d and mixers 607b, 607c, 607d. All n inertial channels 600, 610, 620, 630 are processed with a set of circuitry 608, 618, 628, 638 of CIC filters, adapted to the specific frequencies of the inertial channel and the self-test tones used for that inertial channel. Sets 618, 628, 638 are not shown fully in the figure, but should be understood to be like the set 608 discussed here. The inertial output channel ACC OUT and each self-test tone has its own CIC filter with a preset decimation ratio suitable for the specific inertial output channel or self-test tone frequency. In the current example, CIC filter 606a provides output for the first ACC OUT inertial output channel, comprising the acceleration measurement signal read from the sensor device. The total number of available self-test tones is $n_2$, in this case three (3) for each n inertial channels, so that the total number of different self-test tones available is 12 in this example. The number of self-test tones provided for different inertial channels may vary. As indicated earlier, the number of self-test tones may be freely chosen, and it's preferably two or more, and at least two self-test tones on each inertial channel shall have different frequency. Self-test tones with same frequency may be used on more than one inertial channels. For the exemplary channel 600, each self-test tone has its own CIC filter 606b, 606c, 606d. The decimation ratio of each CIC filter is designed for the specific self-test tone to filter out unwanted frequencies above test frequency so that the incoming self-test tone may be decimated in such a way that the new Nyquist frequency is equal to the specific self-test tone frequency. After CIC filtering, the filtered self-test tones are then fed to down converters 607b, 607c, 607d, respectively, where the samples of the signal representing each self-test tone is converted down into a DC signal called self-test signal. This is achieved by mixing the signal received from the CIC filter with a signal corresponding to the original frequency of the self-test tone signal in the ACC module. In addition to the basic functionalities shown in this schematic figure, phase adjustment may be needed to the self-test tones, in order to match the phase of the signal properly in order to ensure that the test tone magnitude at Nyquist frequency is roughly maximal.

Figure 6B:
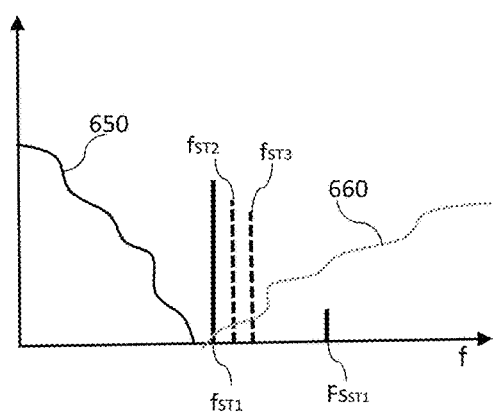
FIGS. 6b and 6c present a schematic presentation of signals in given points of the signal chain.

FIG. 6b describes schematically the frequencies of different signals before down conversion in one self-test branch comprising a CIC decimation filter and a down converter in any of one of sets 608, 618, 628, 638, for example, CIC filter 606b and down converter 607b. Neither the magnitudes nor frequencies are necessarily in scale in FIG. 6b or 6c, as these figures are intended to illustrate the principle only. The fundamental frequency of the self-test tone of interest is marked as $f_{ST1}$, and other self-test tones as $f_{ST2}$ and $f_{ST3}$. The inertial ACC signal 650 has preferably lower frequency than any of the test signals. Harmonics and other unwanted signals 660 exist initially at frequencies higher than the inertial acceleration signal 650 and also mainly above the self-test frequencies $f_{ST1}$, $f_{ST2}$ and $f_{ST3}$. Decimation filter of the specific branch, in this case 606a is used to filter the unwanted signals 660 from the sample, so that sampling of the self-test signals is enabled with their characteristic Nyquist frequency. In this example the sampling frequency $Fs_{ST1}$ is shown for self-test frequency $f_{ST1}$. After the filtering with the decimation filter, the signal representing the test tone with self-test frequency $f_{ST1}$ is ready for down conversion.

Figure 6C:
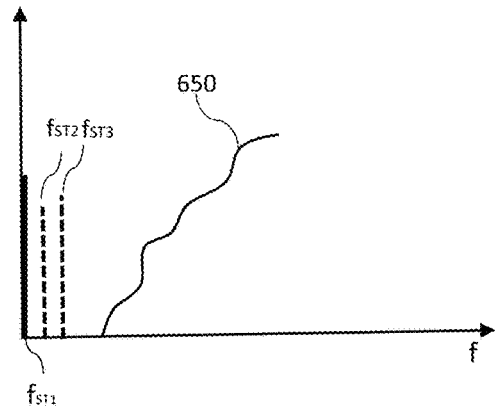

FIG. 6c describes schematically the signal frequencies of the signals in the same signal branch as described in FIG. 6b after down conversion. The test signal of interest, $f_{ST1}$ has now zero frequency, i.e. it is a DC signal, whereas the other self-test frequencies and the inertial signal 650 have higher frequencies, and can be conveniently filtered away, so that the DC value for this self-test signal corresponding to this self-test tone can be detected.

Figure 6D:
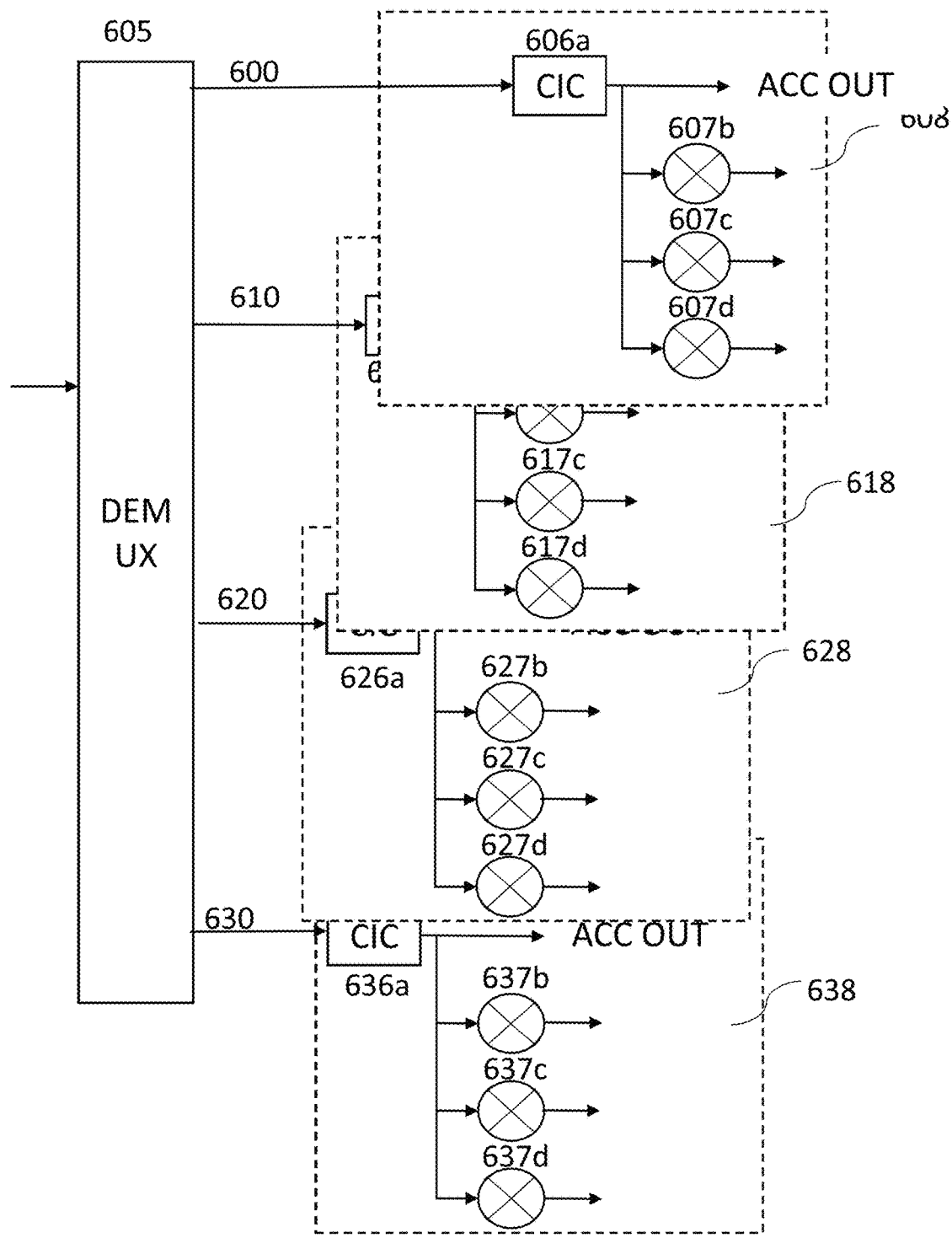
FIG. 6d presents another block diagram of a circuitry implementing demultiplexer, first filter and down conversion.

FIG. 6d presents another exemplary embodiment of demultiplexing, first filtering and down conversion circuitry.

Multiplexed readout channels arrive to demultiplexer module 605, where they're divided to n parallel inertial channels 600, 610, 620, 630. In this example n is 4. Each of these n inertial channels is filtered with a single CIC (cascaded integrator-comb) decimation filter 606a, 616a, 626a, 636a, each configured to perform filtering for the signal in the respective inertial channel. Each inertial channel may represent acceleration along or about a set axis. Each four exemplary inertial channels may be handled in like manner. Processing signal in inertial channel 600 will be described as an example. The decimation ratio of the CIC filter is designed for the respective inertial channel, so that the distinctive fundamental self-test tone frequencies are reproduced in the output data of the CIC filter and the filter attenuation at the tone frequencies is preferably less than 10 dB. After CIC filtering, the filtered ACC OUT signal is fed to a number of down converters 607b, 607c, 607d. In this example the number of self-test tones for the inertial channel 610 is 3. The down converters 607b, 607c, 607d each use a different carrier frequency, so that a different self-test tone is down converted to zero frequency, in other words, into a DC signal. This DC signal is called as the self-test signal. Compared to the earlier embodiment illustrated with FIG. 6a, this alternative embodiment reduces amount and thus also area of circuitry needed for extracting the self-test signals from the inertial channels, as only a single CIC filter is needed per inertial channel. Circuitry preceding the CIC filtering and circuitry following the down conversion may be similar to what was illustrated in FIG. 5.

FIGS. 7a and 7b present two exemplary implementations for multiple capacitive elements comprising half-bridge channels. In this example, we have presented an arrangement with four inertial channels CH1, CH2, CH3 and CH4, but the actual number of the inertial channels may vary without departing from the invention. For example, the total number of inertial channels may alternatively be two, three, five or six. Both FIGS. 7a and 7b present four inertial channels CH1, CH2, CH3 and CH4, each of which have three connections: one rotor mass connection (M) and two stator mass connections (S1 and S2). The difference between the two alternatives presented in these figures is that arrangement in FIG. 7a comprises independent connections to the rotor mass (M) for each inertial channel, whereas in the arrangement of FIG. 7b all inertial channels share a common connection to the rotor mass (M), so that the rotors will always be connected to a common rotor potential. Arrangement in FIG. 7a allows choosing different rotor potentials for different channels, although also same rotor potential may be used. Use of different or separated rotor potentials may improve isolation between channels, or allows optimizing the equivalent bias level for each channel. It should be noted, that although the rotor masses may be electrically connected to the same rotor mass potential, the rotor masses related to different inertial channels are preferably mechanically separate from each other.

FIG. 8 describes timing of an exemplary multiplexing scheme for a four channel capacitor configuration as presented in FIG. 7a or 7b, which enables implementation of a continuous self-test scheme. This example splits time equally between the four inertial channels, but the time allocated to each channel may also vary in dependence of signal capacitor sizes and required settling times. It's not necessary that the different inertial channels are read in round robin style as in the given examples, but one or more channels may be read during multiple time slots during one Ts_CH, i.e. any channel could be read twice in row during two consecutive time slots, thus allowing more time slots for feeding the self-test tone(s) in the other channel(s). In the current example, we use a round-robin multiplexing scheme, and data rate for each inertial channel is defined as Ts_CH, which is equal to the consecutive samples of same channel. The single time slot Ts reserved for each inertial channel is split between reset period (R) and readout a.k.a. charge-transfer period (CT). These time periods correspond to the exemplary periods of R and CT shown in FIG. 2. Reset period (R) is for initializing the readout channel to a known state before detecting the capacitive signal in readout period (CT). To achieve such known state, i.e. correlated double sampling CDS, capacitor reset or chopping may be performed, which leave the channel to a well-controlled state. CDS provides an internal sample of offset value, so that any existing offset may be reduced from the output in next output value, so that the output value is free of offset. Time slot Ts can be split between R and CT periods so that optimal power consumption is achieved and required settling speed is met in both periods, with taking into account any special conditions.

With the four capacitive elements in the current exemplary system, three independent frequencies may be selected for testing each inertial channel. One time slot is used for detecting each inertial channel of interest for the actual acceleration signal and self-test tones, while the remaining three time slots, during which the other three inertial channels are detected, are available for self-test tone input. In other words we can also say that each inertial channel is detected once during the duty cycle, and while one inertial channel is detected, capacitive elements of all other inertial channels are available for self-test tone input. While an inertial channel is being detected, it may not be used for self-test tone input. For example, during first CH1 time slot, the stators of CH1 are connected to virtual ground (VCM), and the CH1 capacitor pair is detected for the signal. Channels CH2, CH3 and CH4 are available for self-test during this time slot. Similarly, during the time slot for CH2 detection, the stators of CH2 are connected to virtual ground and CH2 can be detected for the signal, whereas channels CH1, CH3 and CH4 are available for self-test. In this example, during reset period (R), all rotors are connected to the same rotor potential M. The capacitive signal is detected by transition of rotor potential M from value VR to value XVR. During a self-test tone time slot the stator of a channel used for self-test may connected either to the common rotor potential M or to a self-test bias voltage, depending on whether a capacitive self-test force is needed or not.

An attractive force is created across a signal capacitor, between rotor and stator, when non-zero voltage exists between them. When the signal to be detected is differential, and respective capacitive interface is implemented using a capacitive half-bridge, the two electrostatic forces between each stator and the rotor balance each other, when the two effective bias voltages at the stators are equal and also the signal capacitances are as symmetric as possible. This way the non-zero voltage that's necessary for detection is tolerated. However, even a symmetric bias in a differential element may cause non-linearity, and make the channel more susceptible towards sticking and pull-in, depending on the capacitive electrode type. Therefore, even symmetric bias should be minimized. This is achieved in the multiplexed system, since the bias is present only during the specific multiplex period, i.e. just one fourth of time compared to parallel continuous measurement of all four channels. When an asymmetric self-test force is needed, one of the two stator-rotor electrode pairs is ideally biased to zero, while the other one is biased according to the self-test scheme.

During the time slot Ts for CH1, the stator S2 of CH2 is assumed to be connected/biased, to rotor potential M. Hence, ideally, no electrostatic force exists between CH2 stator and rotor. The S1 of CH2 is biased accordingly to signal STF3. The value of this signal STF3 may be opposite compared to rotor potential. This way attractive force exists between CH2 stator and rotor. The polarity of stator biases may be periodically changed i.e. by mutually switching the bias voltages fed to the two stators M→STF3 and STF3→M, so that electrostatic force becomes an AC signal and the average bias asymmetry is zero. The rate at which the polarity is changed is denoted as $f_{ST1}$, $f_{ST2}$, and $f_{ST3}$. In the example it is assumed that three frequencies are used, and that they are the same for all four inertial channels. However, the channels may utilize different test frequencies if necessary.

If a single variable capacitor was used as capacitive element, feeding a bias voltage will create a DC component to the element. The average attractive force experienced by the rotor and caused by such self-test tone will deviate from zero. Although this is not preferred in many applications, it may be acceptable for others. In case a single stator is available for feeding the self-test tone, the polarity of the signal may not be changed in the traditional manner. Instead of switching polarity, the periods when the bias force is on and off may be switched.

Despite the fact that the time slots used for applying each self-test frequency are independent, all transients within the element interface must be carefully identified. One critical transient is the actual readout pulse that is applied for detecting the capacitive signal of each inertial channel. In FIG. 8 the readout pulse can be assumed to occur in charge-transfer, CT, phase, and typically in the beginning of CT period so that maximum settling time is allowed for the readout transient. This is also the depicted example case as the potential of the mass changes, i.e. charge is moved, at the same time as period R is changed to period CT. Now the stators follow the rotor (M) potential during self-test in such a way that they are the same with zero force and different when non-zero force is needed. This way, when rotor potential changes also the stator value must be changed accordingly. If there is practically any asymmetrical cross-coupling between stators, it will cause output offset due to the stator voltage transient in adjacent channels. This offset can also become unstable if the amount of cross-coupling does not remain constant, e.g. due permittivity drifts in the package. One solution is that rotor bias levels can be independent between the inertial channels, which is enabled i.e. with a structure described in FIG. 7a. This way the voltage level at the rotor that is not currently being detected but instead self-test biased, can be set to be constant between reset period (R) and charge transfer period (CT).

Figures 9, 10:
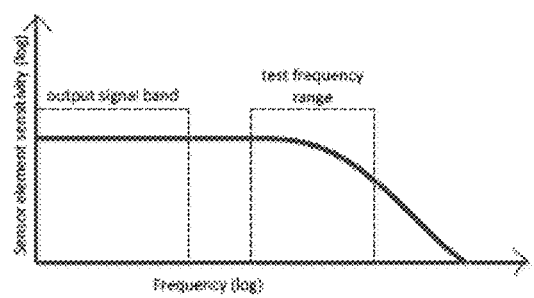
FIG. 9 presents another example of timing of multiplexed channels.
FIG. 10 illustrates frequency ranges of inertial output signal and self-test signals.

FIG. 9 provides another embodiment for the multiplexing control that aims in improving self-test performance when the electrical isolation of rotors is found to be troublesome.

FIG. 9 presents an alternative implementation where the self-test bias voltage may be created during reset (R) only. When the stator potential returns to same level as at rotor bias (M) in the channels that are not currently detected before the charge transfer occurs, no transient and respective offset is created during the detection (CT-period). The detailed timing is sketched in the small table below the main table of FIG. 9, where time transfers in horizontal direction. Both cases are critical: end of R period so that transient is not occurring during charge transfer, and the end of CT period so that the transient does not disturb the charge transfer and signal detection before the signal is sampled.

A further option is to switch stators of non-measured inertial channels also to other essentially constant potential than M, for example to virtual ground VCM, during CT period of the other inertial channel. This case is also relevant when M readout transition (VR→XVR) is timed to occur later than in the very beginning of CT period. The timing change may be required in order to e.g. achieve leakage immunity. This change may cause additional electrostatic force but on the other hand it can reduce capacitive coupling of non-measured stator electrodes to measured stator electrodes during VR to XVR transient in the mass electrode.

When rotor connections M of each inertial channel are separate, like in FIG. 7a, the rotors of all capacitive elements may be connected to potential VR during reset period (R), whereas the rotor potential of only the capacitive element from which the inertial signal is read is changed to the XVR potential during readout period (CT). A yet further option is to connect the rotors to separate mass potentials.

The self-test frequencies, in the exemplary case the frequencies of $f_{ST1}$, $f_{ST2}$ and $f_{ST3}$, may be selected as shown in FIG. 10. The test frequencies should be sufficiently above the signal band of interest so that interference between self-test tones and inertial signals of interest can be avoided. One or more of the self-test frequencies may be also higher than the corner frequency (−3 dB) of the mechanical element, so that any deviation from the predictable corner frequency variation can be observed. Such deviation could be a result of cracked MEMS package and respective pressure level shift within the mechanical device.

The implementation of different self-test tones was described above, and with help of the FIG. 11, more details are disclosed. The picture reveals the implementation of one self-test tone, STF1. The period of tone is set by the rate at which mass-to-stator voltage is varied. In the example it can be selected that sample time of channel one, TS_CH1, is e.g. ¹⁄₆₄ kHz. In the picture single self-test period takes 16 samples, giving a test frequency, 1/TP_STF1, of 4 kHz. This is illustrated with the sine wave fundamental frequency component (STF1) having the periodicity of TP_STF1. Each pulse in a stator potential represents a period when a non-zero bias is applied to the stator.

Figure 11:
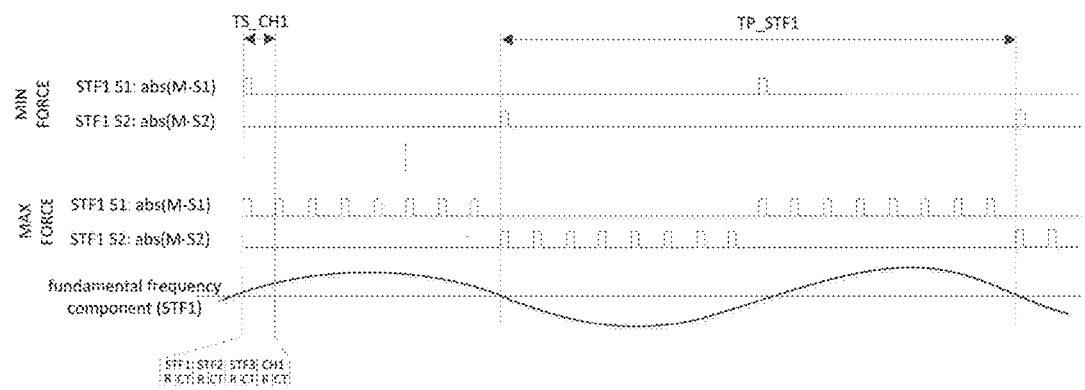
FIG. 11 presents an example of self-test signal frequency and self-test signal magnitude control.

The magnitude of self-test tone may be controlled by changing the voltage level of test signal connected to stator terminals. However, this requires a DAC (digital-to-analog converter) circuit and there may be dynamic range limitations due to low supply voltage level. FIG. 11 further shows how magnitude of the self-test signal can be varied with more optimal way. The upper graph presents an embodiment for low magnitude (MIN FORCE). There, each of the CH1 stators S1 and S2 are excited only once during a time period TP_STF1, i.e. there is only a single pulse for each stator during the respective half of the TP_STF1 period. It should be noted that this graph only shows the absolute value (abs) of the difference between the stator and rotor voltages, but not the polarity. The lower graph presents an embodiment for high magnitude (MAX FORCE). There, each of the CH1 stators S1 and S2 are excited during each time period TS_CH1 available during the respective half of the self-test tone time period TP_STF1, i.e. there are several pulses for each stator. The fundamental (lowest) self-test frequency $f_{ST1}$ does not vary between these MIN FORCE and MAX FORCE cases, since it's defined by the periodicity TP_STF1. However, the magnitude of the fundamental tone is changing. It can be also seen that the magnitude can be easily varied by changing the number of pulses during one test signal period. When both stators are kept at rotor potential during self-test, no additional force is created. Important is that both number and duration of self-test voltage pulses in the direction of both stators must be equal in such a way that no asymmetric DC component is created due to the self-test tone. Note also that the picture is simplified, as in real case, during single TS_CH1, there would be non-zero bias due other self-test tones and readout period, but these are not shown. Instead the stator-to-mass voltage is assumed zero outside STF1 time-slot.

Figure 12:
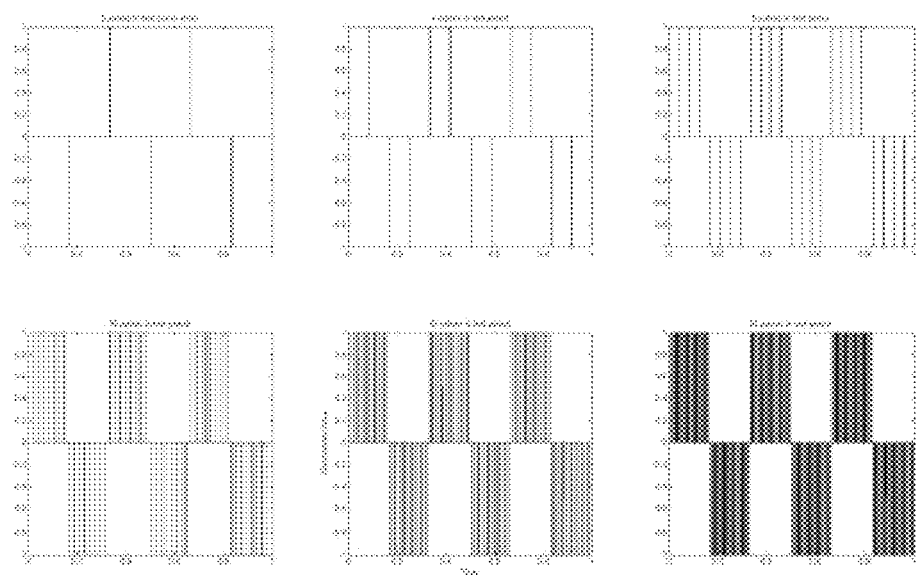
FIG. 12 presents an example of magnitude control.

The magnitude control can be achieved using two different approaches. One option is shown in FIG. 12. The picture depicts the electrostatic force seen by the rotor of one inertial channel. The absolute values in the figure are of no significance. Positive force pulse is created by non-zero rotor to first stator bias and negative voltage by non-zero rotor to second stator bias. Only single non-zero bias is assumed to exist at the time when non-zero force pulse is visible. In the picture the magnitude is increased by adding pulses so that the number of pulses is evenly distributed during each half of the period during which the pulse is positive or negative. The fundamental frequency remains the same. Time between consecutive pulses varies according to the different magnitudes.

Figure 13:
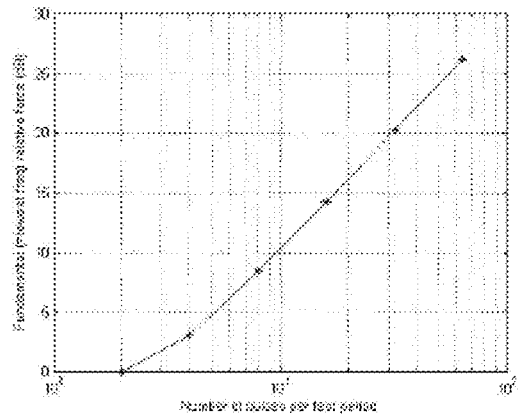
FIG. 13 illustrates setting of magnitude of the fundamental frequency component.

The respective relative magnitude of the fundamental frequency component is shown in FIG. 13. It can be seen that force magnitude doubles with doubled number of pulses in one self-test period. However, significant non-linearity can be detected when the minimal force is doubled in which case the force magnitude is increased by about 40% only. It is also clear that the fundamental self-test frequency has multiple harmonics. These higher frequency signals will be attenuated by the response of the mechanical element and may be further filtered within the electronic interface.

Figure 15:
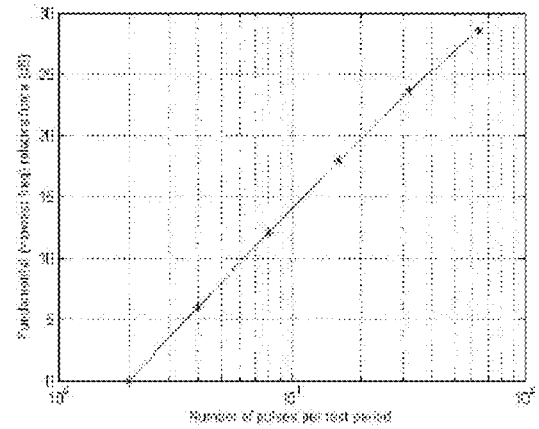
FIG. 15 illustrates another example of setting of magnitude of the fundamental frequency component.
Figure 14:
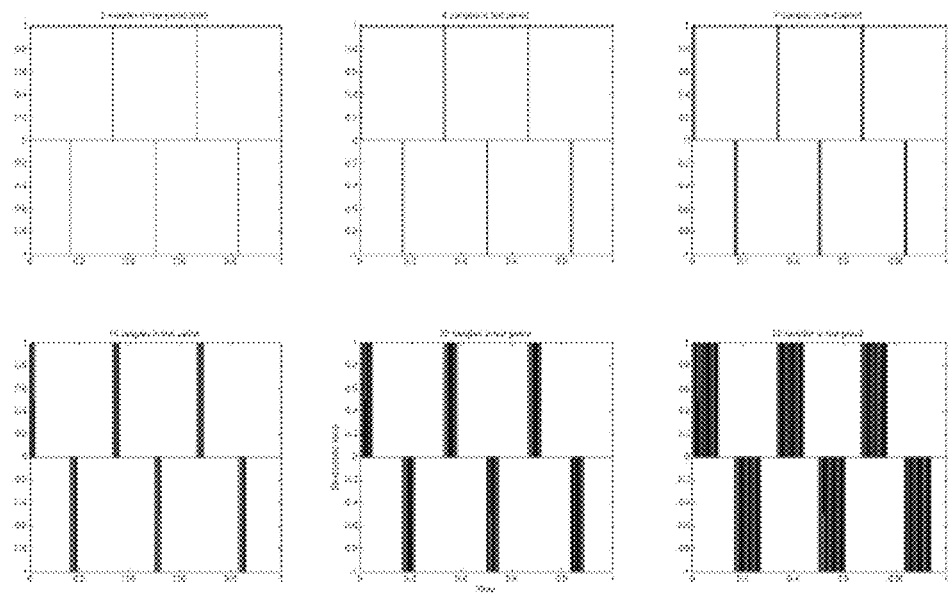
FIG. 14 presents an example of magnitude control.

A second option for magnitude control is depicted in FIG. 14. Here the force magnitude is increased by increasing the number of consecutive samples. The pulses defining the force are added next to each other with minimum spacing (TS_CH) so that two consecutive pulses are in consecutive time slots scheduled for self-test input for the specific inertial channel. After a train of pulses in consecutive slots, there may be a number of slots during which there are no pulses for the same stator, until an equally long train of consecutive pulses in consecutive time slots scheduled for the specific inertial channel is fed to the other stator. This method allows the same linear ratio between force magnitude and number of samples per period to hold until the maximum force condition is approached. Especially, this approach provides a linear ratio between the number of pulses and magnitude when the magnitude is close to the minimum, as shown in FIG. 15. However, this alternative behaves in non-linear manner when the magnitude is approaches the maximum level. The designer may choose between the two options for magnitude control in dependence of the need for linearity of the magnitude of the self-test tone, and whether it's more likely that a magnitude near to minimum or near to maximum would be needed.

Eventually, a self-test signal corresponding to certain self-test tone, e.g. STF1 with frequency $f_{ST1}$, shall be extracted from the ADC output data for monitoring. Process to achieve this is sketched in FIG. 5. First filtering is performed in a first filter module (516) before demodulation of the signals in the down conversion module (517). This first filtering is preferable for reducing or removing any high frequency interference. It should be noticed that there may be in total n sets of filters and demodulators, one set for each of the n inertial channels, so that all self-test tones can be extracted. After the demodulation in the down conversion module (517) using the tone fundamental frequency itself for demodulation and filtering in the second filter module (518) the remaining AC components, the resulting self-test signal that corresponds to the respective self-test tone, e.g. STF1, lies at DC. The level of the valid DC self-test signal can be calibrated by controlling the pulse density as shown in connection to FIGS. 11 to 15. The magnitude level of the self-test signal may be e.g. 0.5-1% of full-scale dynamic range of the ADC converter, so that it is well above noise floor but sufficiently low so that the continuous test motion of the rotor does not interfere with the nominal operation. The phase of the test signal may be controlled by shifting the timing of the pulse train (as described in relation to FIGS. 11, 12 and 14) generating the self-test tone with respect to the operating clock phase of the first filter module (516). This allows the self-test tone magnitude to be maximized at the down conversion module (517) input.

Figure 16:
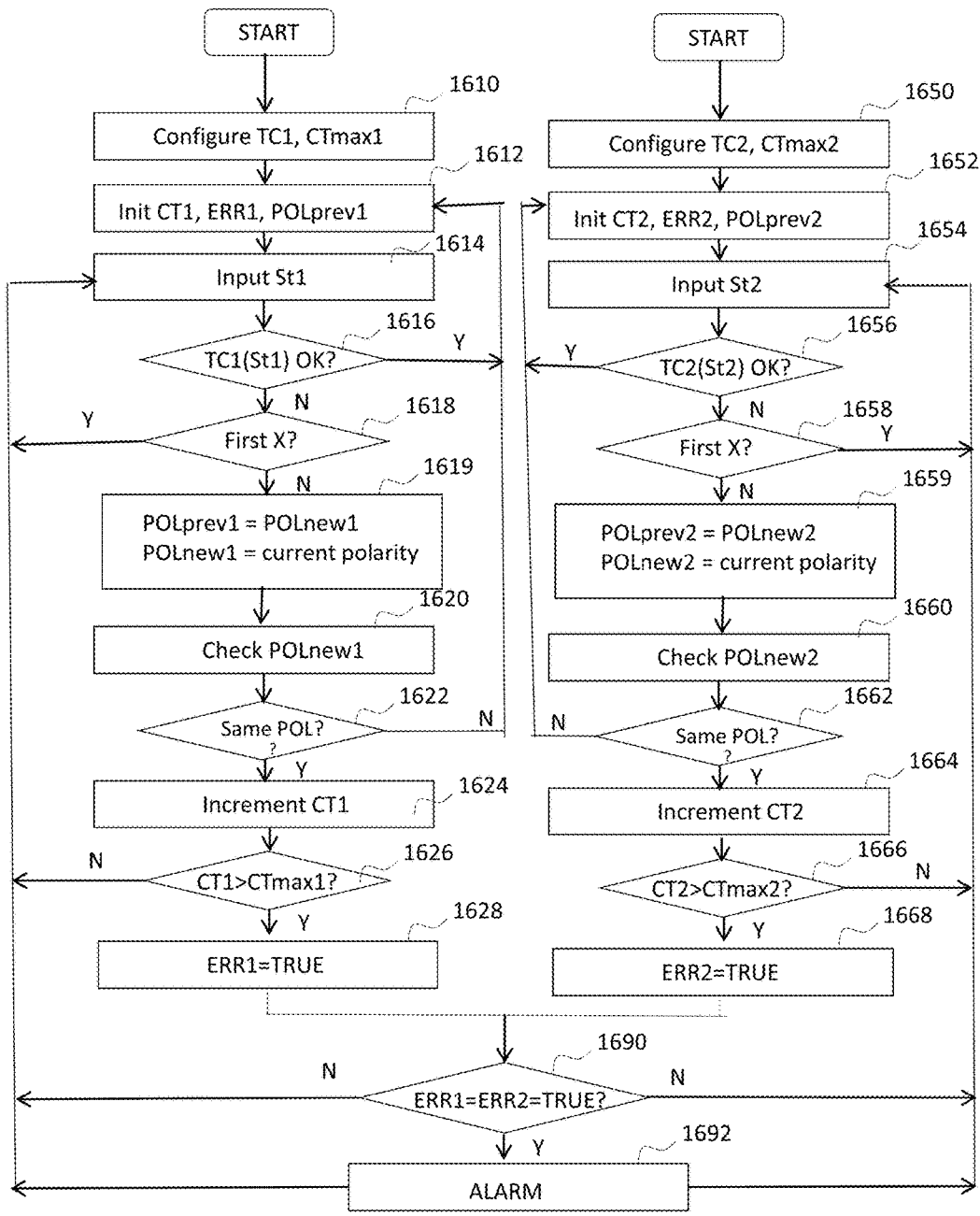
FIG. 16 presents a state machine for continuous self-testing.

A single self-test tone cannot be reliably used for real-time continuous self-test because mechanical vibration can hit at the test frequency and trigger a false alarm. For this reason preferably at least two tone frequencies should be used. FIG. 16 presents an exemplary self-test state machine for a two-frequency case. This kind of self-test state machine may reside within the monitoring module 519. Essential functionality of the self-test state machine is that same threshold must be crossed consecutively for preselected number of times before self-test results in error. The self-test tones are gating the output error flag, which means that the alarm or error flag cannot be set unless all required self-test tones and respective state machines indicate an error. The number of required self-test tones may be selected for the alarm condition. For example, it may be required that all state machines for all test-tones indicate an error before an alarm is set, or that a subset of state machines for a subset of test-tones shall indicate an error before an alarm is set. An alarm may comprise an error flag, for example a bit dedicated to indicating error or a state of an output of the inertial sensor device. In the presence of very high vibration close to self-test frequencies, self-test state machine cannot give a false error flag because it is very improbable that the inertial input would cause same consecutive error polarity for two tones number of times. The probability can be further reduced by using more self-test tones, e.g. three as in the previous examples, or even more.

FIG. 16 illustrates a further embodiment of an accelerometer self-test method. The embodiment applies the dual error detection and enhances the error detection by a further polarity check that reduces false alarms by spurious external motions in challenging operational environments. This functionality may be found within the self-test monitoring module 519 as shown in FIG. 5. In FIG. 16, the left-hand flow relates to a first test tone and the right-hand flow to a second test tone. In the left-hand flow, the method begins by configuring (stage 1610) the test signal analyzer of the accelerometer to include a first trigger condition TC1 that sets an acceptable range for response signals St1 of a first test frequency input T_mf1, and with a first polarity counter threshold CTmax1 that sets a limit for successive abnormal values of same polarity. For the process, parameters POLprev1, CT1, and ERR1 are initialized (stage 1612). When a response signal St1 is received (stage 1614), it is checked (stage 1616) whether the signal value complies with the first trigger condition TC1. If yes, the process may return to stage 1612 for initialization and then continue receiving the response signal St1. If not, the test signal analyzer will check (stage 1618) whether the defined range is crossed for the first time or not. When stage 1616 is for first time reporting not OK state, this is recognized in stage 1618, and the value of POLnew1 is updated to match the polarity of currently processed sample. If the crossing happens for the first time, it is deemed that the process may return to stage 1614. If a new threshold breach at stage 1616 is found to follow after an earlier breach recognized in stage 1618, values of the polarity parameters are updated in stage 1619: first POLprev1 is assigned the value of previous POLnew1, after which POLnew1 is given the polarity value of currently processed sample.

If the crossing has not happened for the first time, the test signal analyzer will check (stage 1620) the polarity of the crossing, i.e. whether the value raises above or falls below the defined range. The determined polarity is then compared (stage 1622) to the polarity POLprev1 in a previous crossing of the defined range. If the polarity of the present crossing POLnew1 is not the same as the polarity of the previous crossing POLprev1, the process may return to stage 1612 to reset the counter and polarity values CT1. In the initialization/reset stage 1612, the parameter POLprev1 may be initially given either of the negative or positive polarity values, and later on the value of the polarity value POLnew1, resulting from stage 1620. If the determined polarity of the present crossing POLnew1 is the same as the polarity POLprev1 in the previous crossing, a first polarity counter CT1 is incremented (stage 1624). Although not shown, the state machine may further comprise functionality for limiting the value of the CT1 counter, so that the value of CT1 counter never exceeds the upper limit CTmax1.

The incremented value of the first polarity counter CT1 is compared to the predefined first polarity counter threshold CTmax1 (stage 1626). If the counter value CT1 is below the threshold, the process may return to stage 1614. If the counter value exceeds the threshold, a Boolean variable ERR1 that indicates a detected error state in the first flow path is set to TRUE (stage 1628).

Similarly, in the right-hand flow, the method begins by configuring (stage 1650) the test signal analyzer of the accelerometer to include a second trigger condition TC2 that sets an acceptable range for response signals St2 of a second test frequency input T_mf2, and with a second polarity counter threshold CTmax2 that sets a limit for successive abnormal values of same polarity. For the process, parameters POLprev2, CT2, and ERR2 are initialized (stage 1652). When a response signal St2 is received (stage 1654), it is checked (stage 1656) whether the signal value complies with the second trigger condition TC2. If yes, the process may return to stage 1652 for initialization and then continue receiving the response signal St2. If not, the test signal analyzer will check (stage 1658) whether the defined range is now crossed for the first time or not. When stage 1656 is for first time reporting not OK state, this is recognized in stage 1658, and the value of POLnew1 is updated to match the polarity of currently processed sample. If the crossing happens for the first time, it is deemed that the process may return to stage 1654. If a new threshold breach at stage 1656 is found to follow after an earlier breach recognized in stage 1658, values of the polarity parameters are updated in stage 1659; first POLprev2 is assigned the value of previous POLnew2, after which POLnew2 is given the polarity value of currently processed sample.

If not, the test signal analyzer will check (stage 1660) the polarity of the crossing, i.e. whether the value raises above or falls below the defined range. The determined polarity POLnew2 is then compared (stage 1662) to the polarity POLprev2 in a previous crossing of the defined range. If the polarity of the present crossing POLnew2 is not the same as the polarity of the previous crossing POLprev2, the process may return to stage 1652 to reset the counter and polarity values. Also in the initialization/reset stage 1652, the parameter POLprev2 may be initially given either of the negative or positive polarity values, and later on the value of the polarity value POLnew2, resulting from stage 1660. If the determined polarity POLnew2 is the same as the previous polarity POLprev2, a second polarity counter CT2 is incremented (stage 1664). The incremented value of the second polarity counter CT2 is compared to the predefined second polarity counter threshold CTmax2 (stage 1666). If the counter value is below the threshold, the process may return to stage 1654. If the counter value exceeds the threshold, a Boolean variable ERR2 that indicates a detected error state in the second flow path is set to TRUE (stage 1668).

The test signal analyzer may now check (stage 1690) the variables ERR1, ERR2, and if both of them are TRUE, trigger an alarm (stage 1692), and return to stages 1614, 1654 to continue reception of the test responses St1, St2. If only one, or neither of the variables ERR1, ERR2 in stage 1690 is TRUE, the process may return directly to stages 1614, 1654. After an alarm has been given, it may be disabled in various ways. For example, it may be disabled automatically, if subsequent measures of ERR1 and ERR2 indicate no error, or the disabling may require reading the alarm and/or some kind of manual reset. Automatic disabling of an alarm after detecting no further alarms is useful in case that any false alarm was triggered, which is possible although not likely.

The described additional polarity check for consecutively failing samples effectively eliminates unnecessary alarms, and makes therefore the self-test function robust and therefore suitable to very demanding applications.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A capacitive sensor device with continuous self-test, the sensor device comprising:
    at least two capacitive elements configured to detect at least two inertial channels; and
    a multiplexer circuitry configured to temporally multiplex said at least two inertial channels,
    wherein at least one of the at least two inertial channels comprises at least two self-test tones with distinctive fundamental frequencies.

2. The capacitive sensor device with continuous self-test according to claim 1, wherein the at least two capacitive elements comprise capacitive half-bridge circuitries, and wherein the capacitive half-bridge circuitries comprise any one of:
    a common rotor connection; and
    separate rotor connections.

3. The capacitive sensor device with continuous self-test according to claim 1, further comprising:
    self-test control circuitry configured to control feeding of the at least two self-test tones into at least one of the at least two capacitive elements of the sensor device;
    readout circuitry configured to provide voltage readout information on each of the at least two multiplexed inertial channels;

demultiplexer circuitry configured to demultiplex the at least two multiplexed inertial channels into at least two parallel inertial output channels; and self-test processing circuitry configured to process the at least two inertial output channels to extract at least two self-test signals corresponding to the at least two self-test tones.

4. The capacitive sensor device with continuous self-test according to claim 3, the sensor device further comprising:

self-test monitoring circuitry configured to continuously analyze the at least two self-test signals, the self-test monitoring circuitry triggering an alarm when an error condition is detected.

5. The capacitive sensor device with continuous self-test according to claim 3, the sensor device further comprising at least one analog-to-digital converter circuitry, and the at least two inertial output channels comprise digital signals, and the analog-to-digital converter circuitry is configured to perform any one of:

converting the at least two inertial channels into digital signals prior to demultiplexing the at least two inertial channels for producing the at least two inertial output channels; and converting the at least two inertial output channels into digital signals after the at least two inertial output channels have been demultiplexed.

6. The capacitive sensor device with continuous self-test according to claim 3, the sensor device comprising circuitry for feeding each one self-test tone as temporally controlled bias voltage pulses to at least one stator of a selected capacitive element, wherein the self-test tone is fed to the selected capacitive element only when the respective capacitive element is not being detected by the readout circuitry.

7. The capacitive sensor device with continuous self-test according to claim 6, wherein the fundamental frequency of the self-test tone is defined by the frequency of switching the polarity of trains of said bias voltage pulses fed to at least two stators of the selected capacitive element.

8. The capacitive sensor device with continuous self-test according to claim 6, wherein a phase of the self-test tone is adjusted by temporally adjusting a timing of the start of the trains of bias voltage pulses fed into a selected stator of the selected capacitive element.

9. The capacitive sensor device with continuous self-test according to claim 6, wherein the bias voltage pulses of the self-test tone are fed to the at least one stator in at least one of:

only during a reset period of a channel selection period of another inertial channel; and during both a reset period and a readout period of a channel selection period of another inertial channel.

10. The capacitive sensor device with continuous self-test according to claim 6, wherein the self-test control circuitry is configured to control the magnitude of the self-test tone by adjusting a number of bias voltage pulses per period of the fundamental frequency fed to the at least one stator.

11. The capacitive sensor device with continuous self-test according to claim 1, wherein each of the at least two inertial channels comprise at least two different self-test tones with distinctive fundamental frequencies.

12. A continuous self-test method for a capacitive sensor device, the method comprising:

detecting output of at least two capacitive elements, the output corresponding to at least two inertial channels; and temporally multiplexing the at least two inertial channels, wherein at least one of the at least two inertial channels comprises at least two self-test tones with distinctive fundamental frequencies.

13. The continuous self-test method for a capacitive sensor device according to claim 12, further comprising:

controlling feeding of the at least two self-test tones into the at least one capacitive element of the capacitive sensor device;

providing voltage readout information on each of the at least two multiplexed inertial channels;

demultiplexing the at least two multiplexed inertial channels into at least two parallel inertial output channels; and processing the at least two inertial output channels for extracting at least two self-test signals corresponding to the at least two self-test tones.

14. The continuous self-test method for a capacitive sensor device according to claim 13, further comprising:

continuously analyzing the at least two self-test signals, and based on the continuous analyzing, triggering an alarm when an error condition is detected.

15. The continuous self-test method for a capacitive sensor device according to claim 13, wherein the at least two inertial output channels comprise digital signals, and said digital signals are obtained by any one of:

converting the at least two inertial channels into digital signals prior to demultiplexing the at least two inertial channels for producing the at least two inertial output channels; and converting the at least two inertial output channels into digital signals after the at least two inertial output channels have been demultiplexed.

16. The continuous self-test method for a capacitive sensor device according to claim 13, further comprising feeding each one self-test tone as temporally controlled bias voltage pulses to at least one stator of a selected capacitive element, wherein the self-test tone is fed to the selected capacitive element only when the respective capacitive element is not being detected.

17. The continuous self-test method for a capacitive sensor device according to claim 16, further comprising defining the fundamental frequency of the self-test tone by the frequency of switching the polarity of the trains of bias voltage pulses fed to at least two stators of the selected capacitive element.

18. The continuous self-test method for a capacitive sensor according to claim 17, further comprising controlling a phase of the self-test tone by temporally adjusting the timing of the start of the trains of bias voltage pulses fed into a selected stator of the selected capacitive element.

19. The continuous self-test method for a capacitive sensor according to claim 16, further comprising controlling a magnitude of the self-test tone by adjusting a number of bias voltage pulses per period of the fundamental frequency fed to the at least one stator.

20. The continuous self-test method for a capacitive sensor device according to claim 16, wherein the bias voltage pulses are fed to the at least one stator in at least one of:

only during a reset period of a channel selection period of another inertial channel; and during both a reset period and a readout period of a channel selection period of another inertial channel.

21. The continuous self-test method for a capacitive sensor according to claim 20, further comprising adjusting the number of bias voltage pulses per period of the fundamental frequency fed to the at least one stator of the sensor device, the adjusting comprising any one of:
- keeping the period between two consecutive bias voltage pulses the same during a defined part of each half of the fundamental frequency period of the self-test tone; and
- dividing a set number of bias voltage pulses evenly over the period of the fundamental frequency of the self-test tone.

22. The continuous self-test method for a capacitive sensor according to claim 12, wherein each of the at least two inertial channels comprise at least two different self-test tones with distinctive fundamental frequencies.

* * * * *